(12) United States Patent
Cipriani et al.

(10) Patent No.: US 10,309,084 B2
(45) Date of Patent: Jun. 4, 2019

(54) TUB SPOUT ASSEMBLY

(71) Applicant: Delta Faucet Company, Indianapolis, IN (US)

(72) Inventors: Mark Cipriani, Carmel, IN (US); Michael Scot Rosko, Greenwood, IN (US)

(73) Assignee: Delta Faucet Company, Indianapolis, IN (US)

( * ) Notice: Subject to any disclaimer, the term of this patent is extended or adjusted under 35 U.S.C. 154(b) by 0 days.

(21) Appl. No.: 15/597,845

(22) Filed: May 17, 2017

(65) Prior Publication Data

US 2017/0335551 A1 Nov. 23, 2017

Related U.S. Application Data

(60) Provisional application No. 62/339,482, filed on May 20, 2016.

(51) Int. Cl.

| E03C 1/04 | (2006.01) |
|---|---|
| E03C 1/24 | (2006.01) |
| F16K 3/26 | (2006.01) |
| E03C 1/042 | (2006.01) |
| F16K 21/00 | (2006.01) |
| F16K 31/44 | (2006.01) |
| E03C 1/02 | (2006.01) |

(52) U.S. Cl.
CPC ............. *E03C 1/042* (2013.01); *E03C 1/04* (2013.01); *E03C 1/24* (2013.01); *F16K 3/26* (2013.01); *F16K 21/00* (2013.01); *F16K 31/44* (2013.01); *E03C 1/02* (2013.01); *E03C 2201/30* (2013.01); *E03C 2201/80* (2013.01)

(58) Field of Classification Search
CPC .......................................... E03C 1/042
USPC ....................................... 4/678, 679
See application file for complete search history.

(56) References Cited

U.S. PATENT DOCUMENTS

| 3,739,806 A * | 6/1973 | Bucknell ............... E03C 1/0404 |
|---|---|---|
| | | 137/119.01 |
| 5,979,776 A | 11/1999 | Williams |
| 6,219,858 B1 | 4/2001 | Farmer |
| 6,292,958 B1 * | 9/2001 | Benne ...................... E03C 1/04 |
| | | 4/674 |
| 6,381,770 B1 | 5/2002 | Raisch |
| 6,421,848 B2 | 7/2002 | Farmer |

(Continued)

FOREIGN PATENT DOCUMENTS

WO 2015126089 8/2015

*Primary Examiner* — Christine J Skubinna
(74) *Attorney, Agent, or Firm* — Faegre Baker Daniels LLP

(57) ABSTRACT

A tub spout assembly is configured to be supported within the overflow opening in the sidewall of a bathtub. The tub spout assembly illustratively includes an overflow body defining an overflow passageway, and an inlet tube supported by the overflow body and defining an inlet passageway. A spout is fluidly coupled to the inlet tube and defines a spout outlet to dispense water from the inlet tube into the bathtub. A spout cover illustratively receives the spout and includes an inner wall defining at least one opening. The at least one opening is illustratively in fluid communication with the overflow passageway and the inlet passageway. Illustratively, a diverter assembly is supported by the spout and is configured to selectively open and close fluid communication between the inlet passageway to the spout outlet.

27 Claims, 19 Drawing Sheets

(56) References Cited

U.S. PATENT DOCUMENTS

| | | |
|---|---|---|
| 6,823,539 B1 | 11/2004 | Bantz |
| 6,920,892 B2 | 7/2005 | Agresta et al. |
| 7,007,319 B2 | 3/2006 | Dunnett et al. |
| 7,178,178 B2 * | 2/2007 | Hutchings ............... H02J 5/005 4/496 |
| 7,278,178 B2 | 10/2007 | Witzleben |
| 7,313,834 B2 | 1/2008 | Tan et al. |
| 7,761,938 B1 | 7/2010 | Peters |
| 7,818,830 B2 | 10/2010 | Thorne et al. |
| 8,176,580 B2 | 5/2012 | Kajuch et al. |
| 8,231,064 B2 | 7/2012 | Lum et al. |
| 8,898,828 B2 | 12/2014 | Aykens et al. |
| 9,074,356 B2 | 7/2015 | Tarantino |
| 9,157,221 B2 | 10/2015 | Pan |
| 2007/0130688 A1 | 6/2007 | Thorne et al. |
| 2009/0178192 A1 | 7/2009 | Vassilev |
| 2010/0006164 A1 | 1/2010 | Moncayo et al. |
| 2013/0175350 A1 | 7/2013 | Marks |
| 2014/0230144 A1 * | 8/2014 | Bors ..................... E03C 1/0401 4/695 |
| 2015/0191901 A1 | 7/2015 | Kacik et al. |
| 2015/0211218 A1 | 7/2015 | Buysse |
| 2016/0305100 A1 | 10/2016 | Du et al. |

* cited by examiner

TUB SPOUT ASSEMBLY

CROSS-REFERENCE TO RELATED APPLICATION

The present application claims priority to U.S. Provisional Patent Application Ser. No. 62/339,482, filed May 20, 2016, the disclosure of which is expressly incorporated herein by reference.

BACKGROUND AND SUMMARY OF THE DISCLOSURE

The present invention relates generally to a tub spout assembly that is supported within the overflow opening in the sidewall of a bathtub.

Conventional bathtubs often include a tub spout assembly having a water delivery spout that protrudes significantly outwardly from a sidewall. A diverter assembly including a lift rod is often supported by the delivery spout for diverting water between an outlet of the delivery spout and a showerhead. Such bathtubs also often have an overflow opening within the sidewall to provide fluid communication with a drain should water reach a certain level within the bathtub.

It is desired to provide a tub spout assembly including a delivery spout with an aesthetically pleasing appearance and, more particularly, with a limited profile extending outwardly from a bathtub sidewall and covering an overflow opening within the bathtub sidewall. In addition, it is desired to provide a tub spout assembly including a diverter assembly combined with a delivery spout and an overflow inlet.

According to an illustrative embodiment of the present disclosure, a tub spout assembly includes an overflow body defining an overflow passageway, and an inlet tube supported by the overflow body and defining an inlet passageway. A spout is fluidly coupled to the inlet tube, and a spout cover receives the spout and includes an inner wall defining at least one opening. The at least one opening is in fluid communication with the overflow passageway and the inlet passageway, wherein the overflow passageway surrounds the inlet passageway within the overflow body.

According to a further illustrative embodiment of the present disclosure, a tub spout assembly includes an overflow body defining an overflow passageway, an inlet tube supported by the overflow body and defining an inlet passageway, and a spout fluidly coupled to the inlet tube. A spout cover receives the spout and includes an inner wall defining an opening in fluid communication with the inlet passageway. A diverter assembly is supported by the spout and is configured to selectively open and close fluid communication between the inlet passageway to the spout outlet.

According to another illustrative embodiment of the present disclosure, a tub spout assembly configured for mounting on a sidewall of a bathtub includes an overflow body defining an overflow passageway, the overflow body comprising an overflow mounting flange configured to be supported on an outer surface of the sidewall of the bathtub, and an inlet tube supported by the overflow body and defining an inlet passageway. A spout is fluidly coupled to the inlet tube and includes a spout outlet. A spout cover receives the spout and includes an inner wall defining at least one opening in fluid communication with the overflow passageway and the inlet passageway. A clamp flange supports the spout cover and is configured to be supported on an inner surface of the sidewall of the bathtub. The overflow mounting flange and the clamp flange cooperate to mount the tub spout assembly on the sidewall of the bathtub.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF DRAWINGS

A detailed description of the drawings particularly refers to the accompanying figures in which.

DETAILED DESCRIPTION OF THE DRAWINGS

The embodiments of the invention described herein are not intended to be exhaustive or to limit the invention to the precise forms disclosed. Rather, the embodiments selected for description have been chosen to enable one skilled in the art to practice the invention. Although the disclosure is described in connection with water, it should be understood that additional types of fluids may be used.

Figure 2:
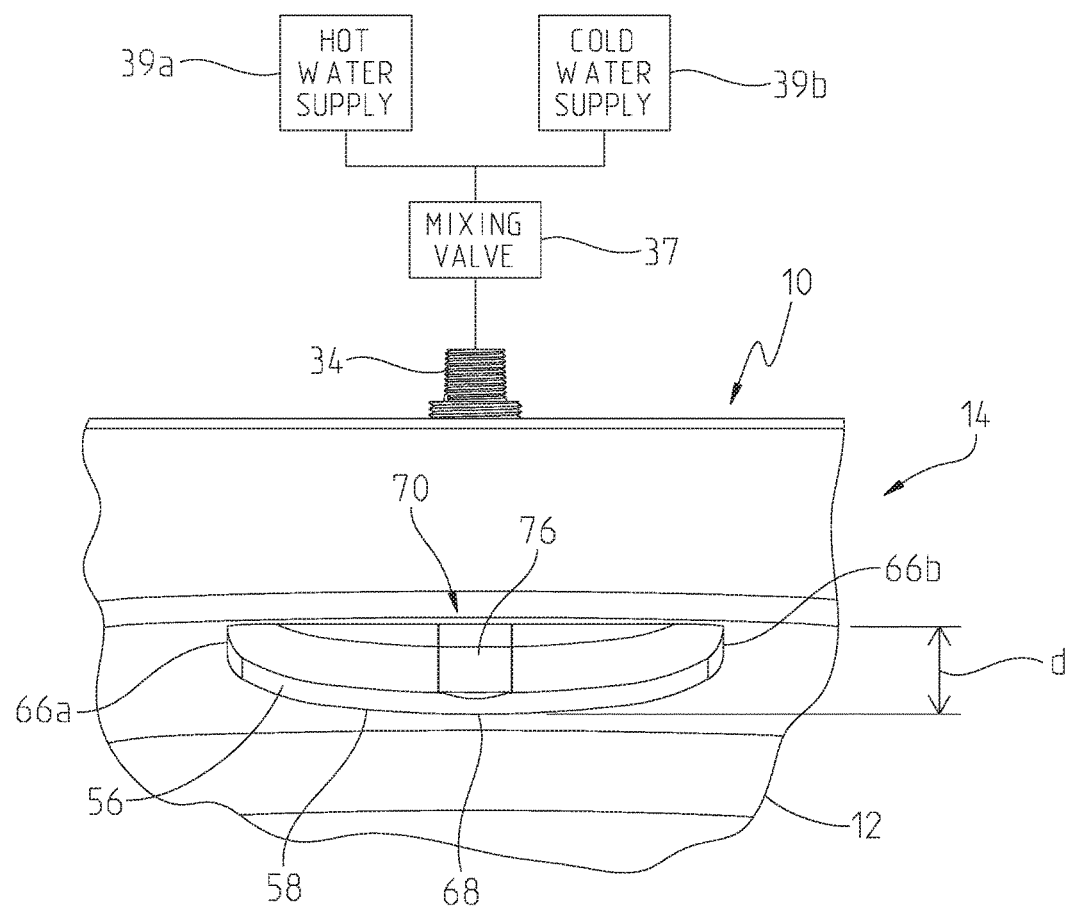
FIG. 2 is a top plan view of the spout assembly of FIG. 1.
Figure 3:
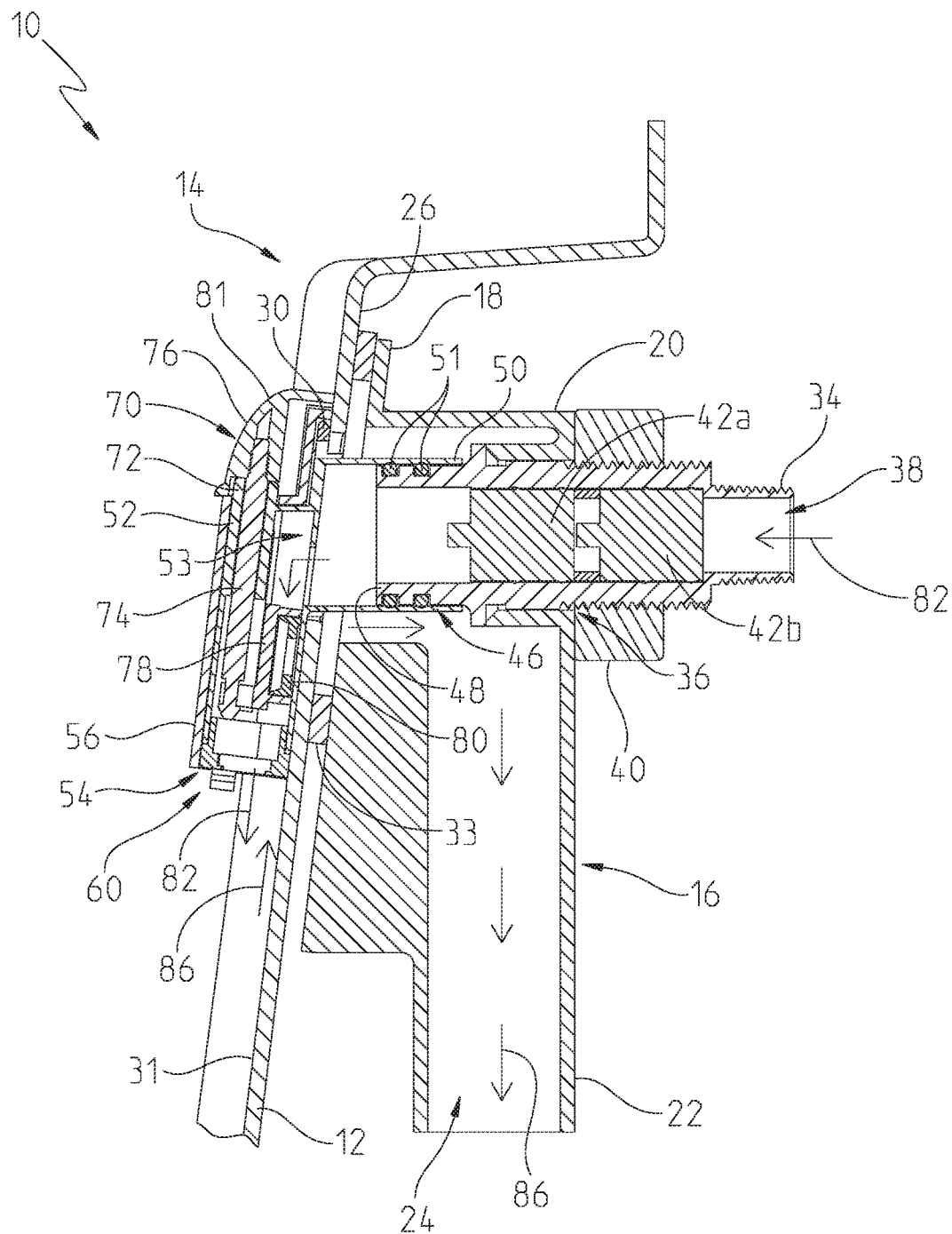
FIG. 3 is a cross-sectional view of the spout assembly of FIG. 1, taken along line 3-3.
Figure 4:
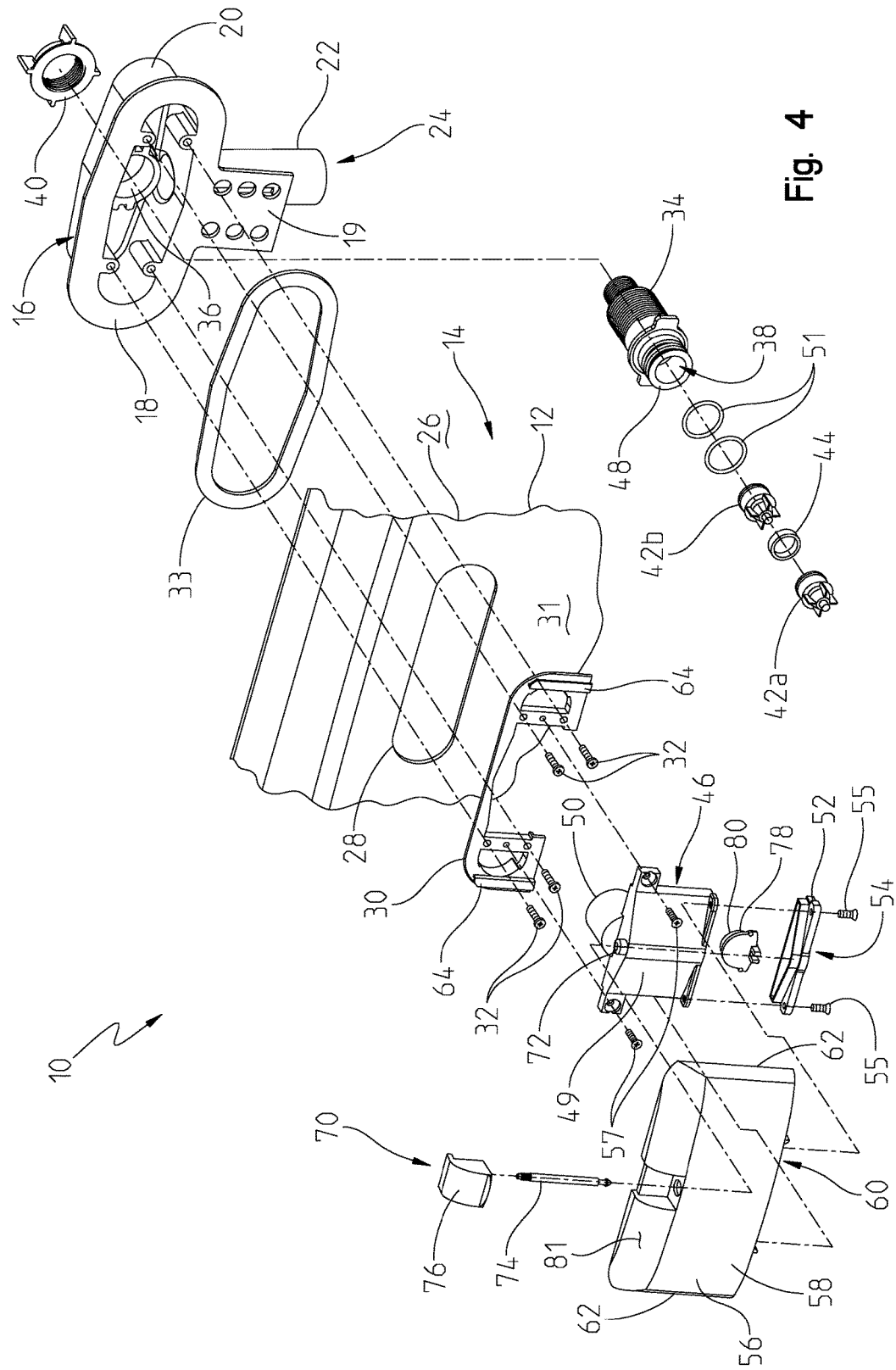
FIG. 4 is an exploded perspective view of the spout assembly of FIG. 1.
Figure 5:
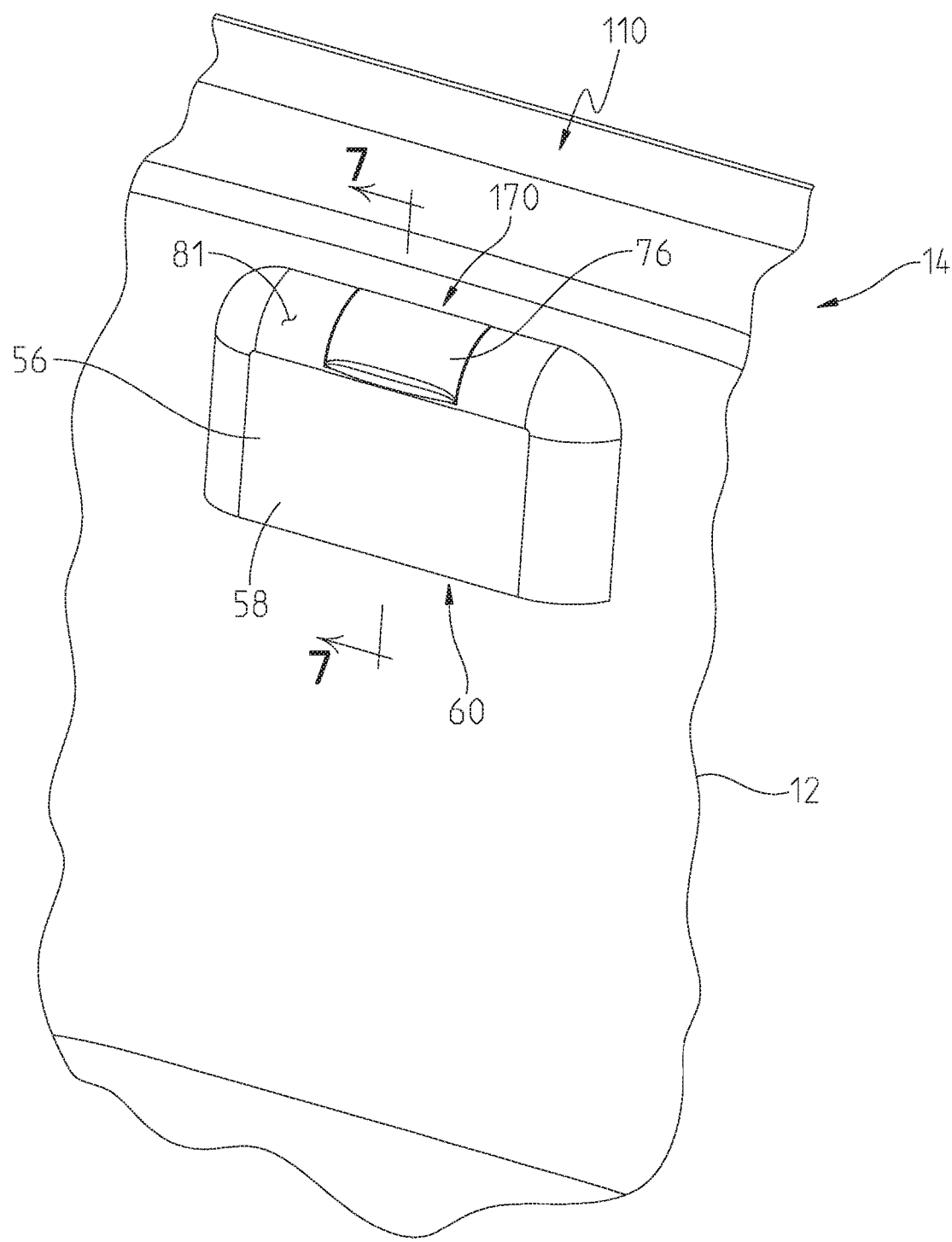
FIG. 5 is a perspective view of an illustrative spout assembly coupled to a bathtub wall.
Figure 6:
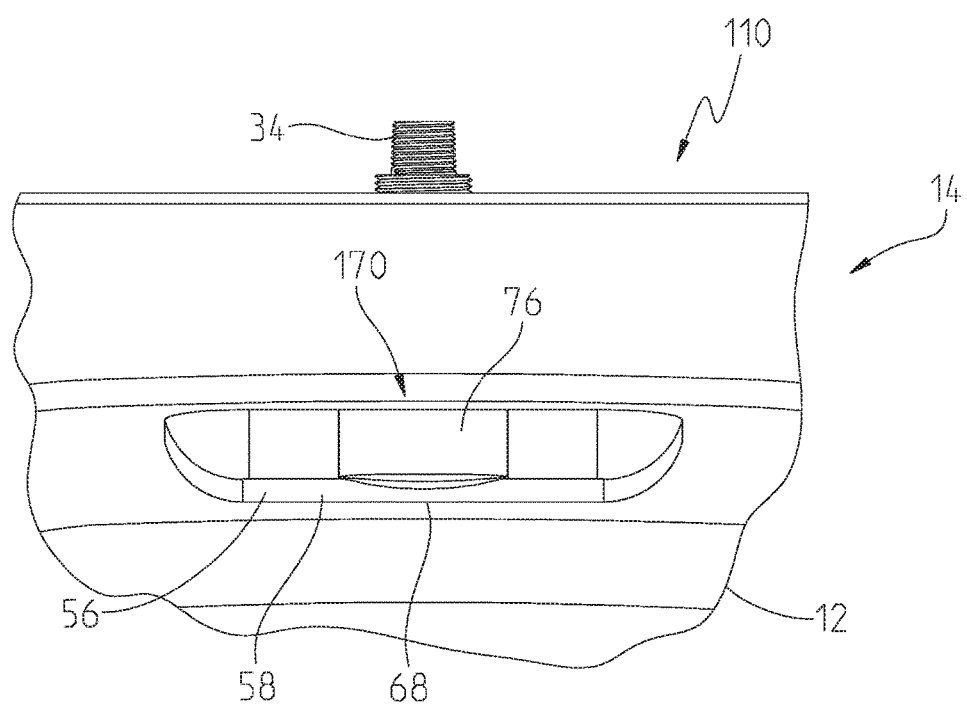
FIG. 6 is a top plan view of the spout assembly of FIG. 5.

Referring initially to FIGS. 1-4, an illustrative embodiment tub spout assembly 10 is shown mounted to a sidewall 12 of a bathtub 14. The tub spout assembly 10 includes an overflow body 16 including a mounting flange 18, a rearwardly extending housing 20, and a downwardly extending overflow tube 22 defining an overflow passageway 24. The mounting flange 18 is illustratively supported on an outer surface 26 of the sidewall 12 around an elongated overflow opening 28 of the bathtub 14 (FIG. 4). Illustratively, a mounting extension 19 extends downwardly from the mounting flange 18 and may receive fasteners and/or adhesives for coupling to the side wall 12 of the bathtub 14.

A clamp flange 30 is illustratively supported on an inner surface 31 of the sidewall 12. Conventional fasteners, such as bolts 32, may secure the mounting flange 18 to the clamp flange 30, and thereby secure the overflow body 16 and the clamp flange 30 to the sidewall 12 of the bathtub 14. An elastomeric gasket 33 may be positioned intermediate the mounting flange 18 and the outer surface 26 of the sidewall 12.

A waterway insert or inlet tube 34 is supported by a rear opening 36 in the overflow body 16 and defines an inlet passageway 38. Illustratively, the inlet tube 34 is fluidly coupled to a conventional mixing valve 37 which, in turn, is coupled to a hot water supply 39a and a cold water supply 39b (FIG. 2). A mounting nut 40 is illustratively threadably coupled with the inlet tube 34, thereby securing the inlet tube 34 to the overflow body 16. Check valves 42a and 42b are illustratively received within the inlet tube 34 and are separated by a spacer 44. The check valves 42a and 42b are configured to prevent backflow from overflow water within the bathtub 14 into the mixing valve 37, and water supplies 39a, 39b, fluidly coupled to the inlet tube 34.

An outlet, illustratively a spout 46, is fluidly coupled to the inlet tube 34. The spout 46 illustratively includes a main spout housing or body 49 supporting an inlet or receiving tube 50. An outlet end 48 of the inlet tube 34 is illustratively received within the receiving tube 50 of the spout 46. Seals, such as o-rings 51, are received intermediate an outer surface of the inlet tube 34 and an inner surface of the receiving tube 50.

The spout 46 illustratively further includes a downwardly extending dispenser or flow director housing 52 defines a downwardly facing spout opening 54. The flow director housing 52 is fluidly coupled with the spout body 49 to define an outlet passageway 53. Fasteners, such as bolts 55, may secure the flow director housing 52 to the spout body 49.

An outlet cap or spout cover 56 receives the spout 46, including the spout body 49 and the flow director housing 52. The spout cover 56 illustratively includes an inner wall 58 defining a downwardly facing opening 60. In the illustrative embodiment shown in FIGS. 2-4, inner wall 58 is arcuate in shape. Illustratively, the spout cover 56 includes opposing grooves 62 that slidably receive cooperating rails 64 supported by the clamp flange 30, thereby releasably securing the spout cover 56 to the clamp flange 30 (FIG. 4).

Illustratively, the opening 60 of the spout cover 56 is in fluid communication with the overflow passageway 24 and the inlet passageway 38 (through the spout opening 54). As shown in FIGS. 3 and 4, the overflow passageway 24 surrounds the inlet passageway 38 supported within the overflow body 16. As such, the overflow water 86 tends to avoid, by being separated from (e.g. below). the inlet water 82.

With further reference to FIG. 2, the inner wall 58 of the spout cover 56 illustratively curves inwardly from opposing ends 66a, 66b toward an apex 68. Illustratively, the apex 68 is substantially flush with the sidewall 12 of the bathtub 14.

In certain illustrative embodiments, the apex 68 is spaced no more than 1.0 inch from the sidewall 12 ("d" in FIG. 2). More particularly, the apex 68 is illustratively spaced by distance "d" between 0.5 inches and 1.0 inches from the sidewall 12.

Figure 1:
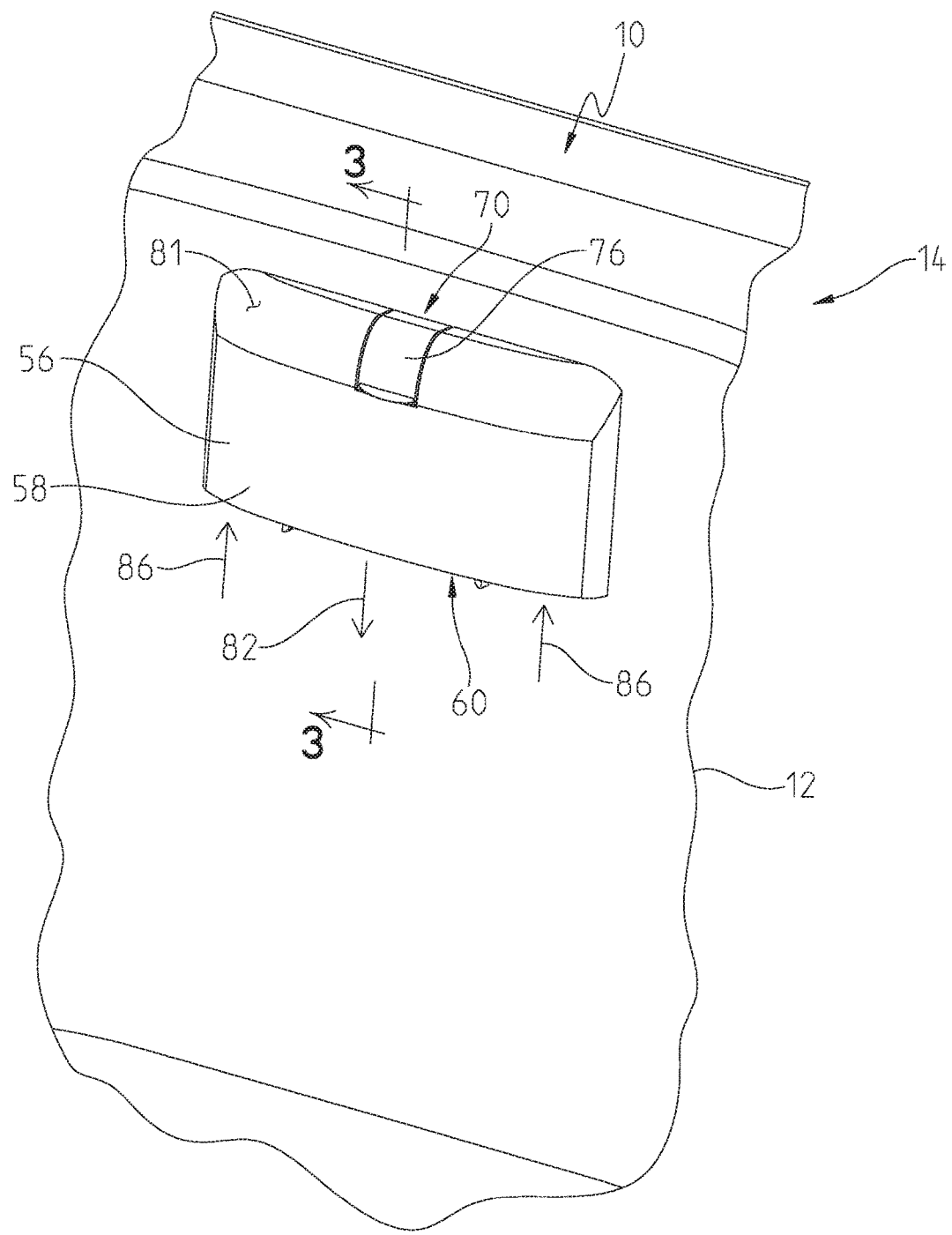
FIG. 1 is a perspective view of an illustrative spout assembly coupled to a bathtub wall.

A diverter assembly 70 is illustratively supported by the spout 46. More particularly, the spout 46 defines a passageway 72 configured to slidably receive at least one diverter or lift rod 74. A diverter pull or knob 76 is supported by an upper end of the lift rod 74, while a plunger 78 is supported by a lower end of the lift rod 74. In the illustrative embodiment as shown in FIGS. 1 and 3, the diverter pull or knob 76 is configured to be received within the spout cover 56. Illustratively, a surface of diverter pull or knob 76 and wall 58 cooperate to form a relatively flush outer surface 81. A sealing gasket 80 may be supported by the plunger 78.

A further illustrative embodiment tub spout assembly 110 is shown in FIGS. 5-10. Tub spout assembly 110 has many of the same components as tub spout assembly 10 identified above. As such, similar components will be identified with like reference numbers. Illustrative tub spout assembly 10 includes diverter assembly 70 having a single diverter or lift rod 74, while illustrative tub spout assembly 110 includes diverter assembly 170 having two diverter or lift rods 74. It should be appreciated that a variety of different configuration diverter assemblies may be used with the tub spout assemblies 10 and 110 of the present disclosure.

Figure 7:
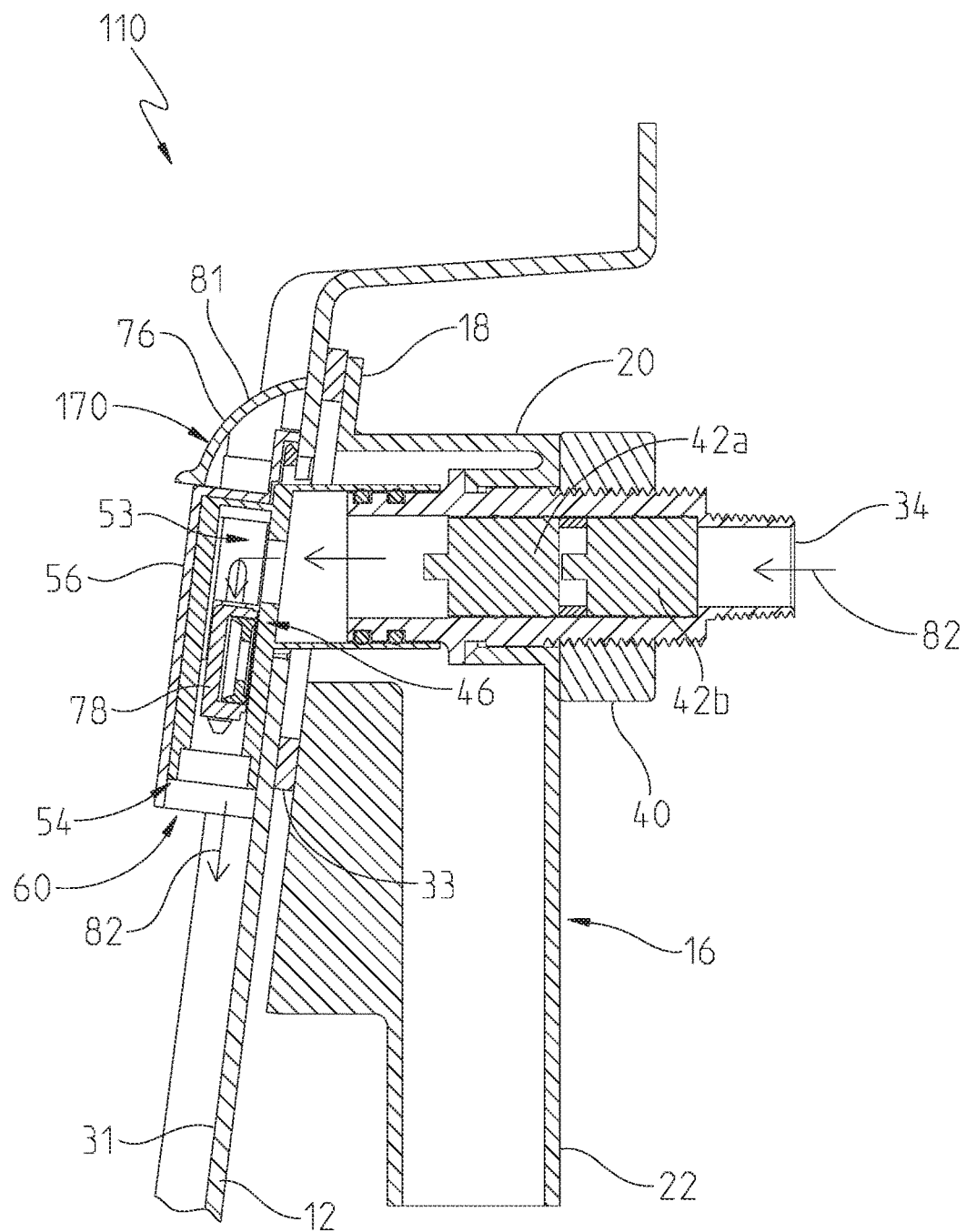
FIG. 7 is a first cross-sectional view of the spout assembly of FIG. 5, taken along line 7-7, showing inlet water flow in a non-diverted mode when the diverter is in a lowered position.
Figure 8:
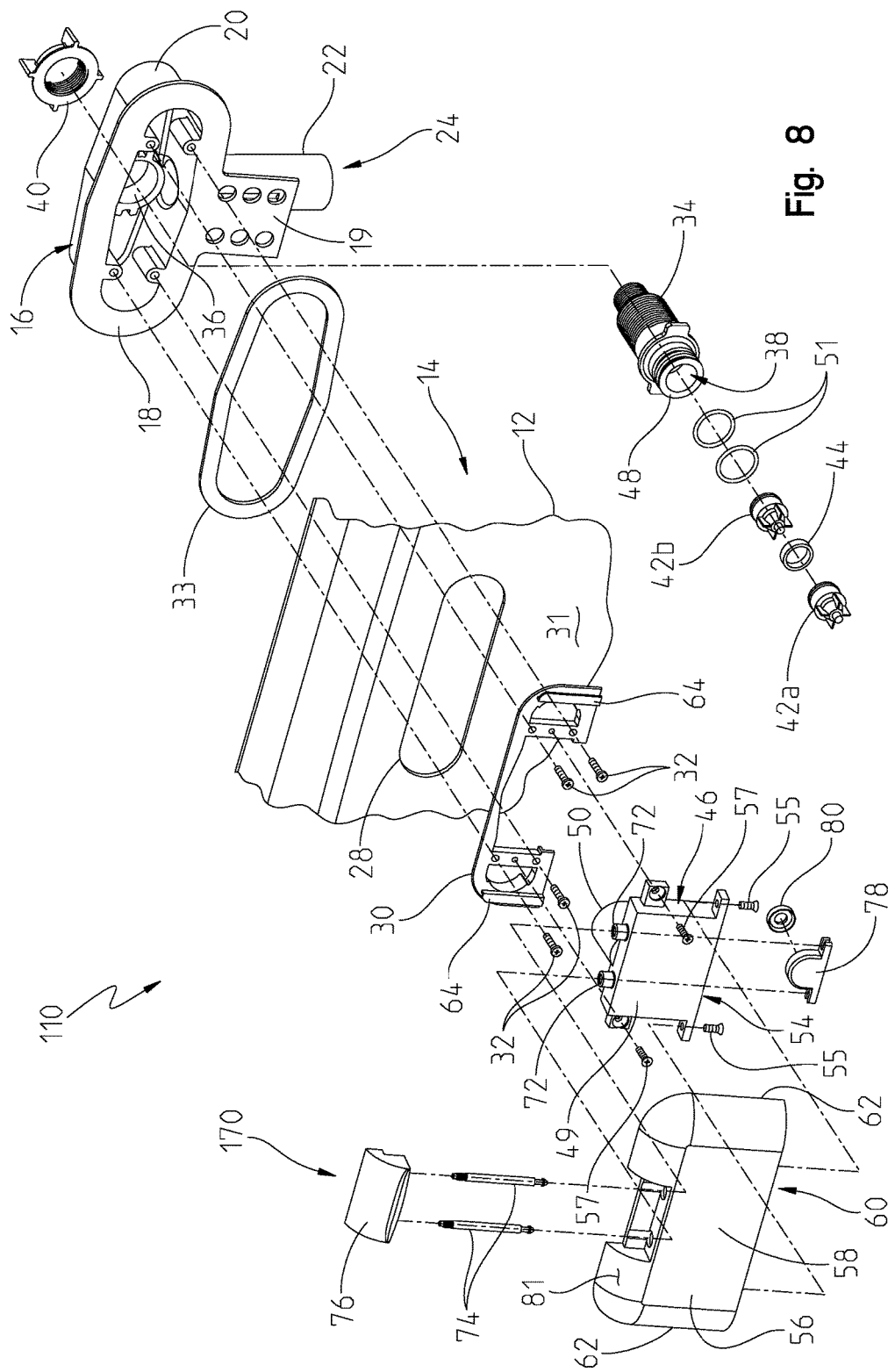
FIG. 8 is an exploded perspective view of the spout assembly of FIG. 5.
Figure 9:
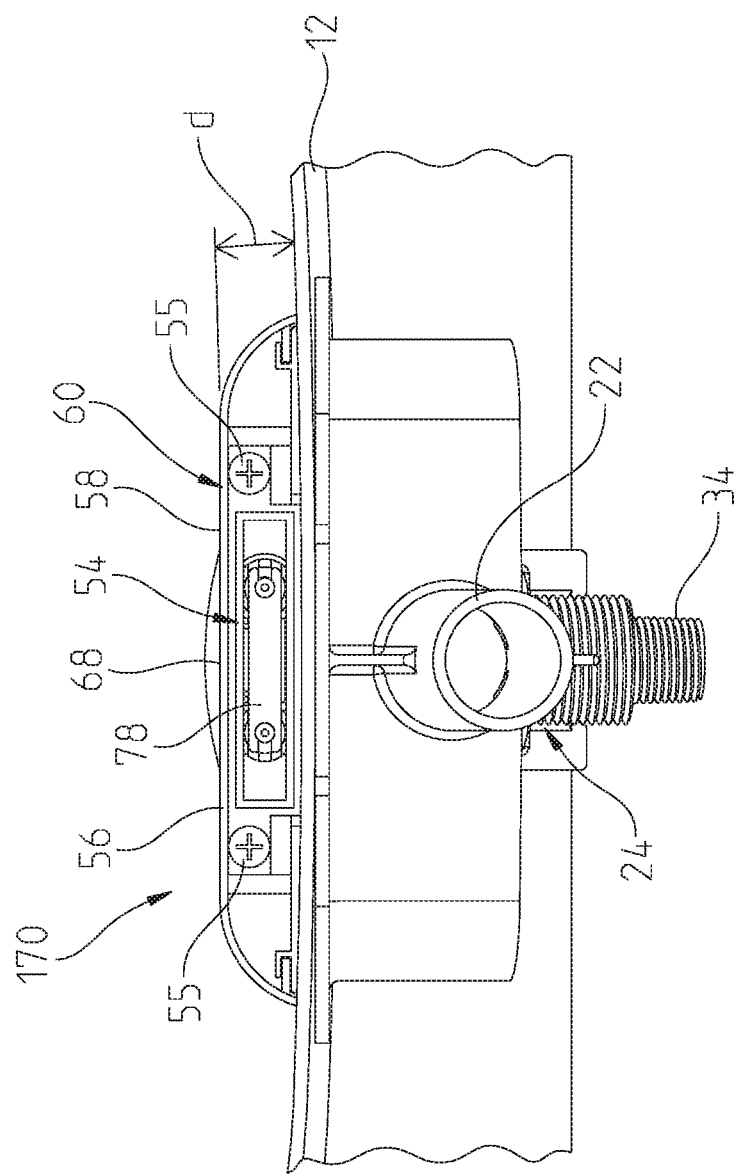
FIG. 9 is a bottom plan view of the spout assembly of FIG. 5.

In a lowered position of the plunger 78, the diverter assembly 70, 170 is in a non-diverted mode such that water flows through the inlet passageway 38 to the spout opening 54 (as shown by arrows 82 in FIGS. 3 and 7). FIG. 7 is a cross-sectional view of tub spout assembly 110 showing water flow (arrows 82) in the non-diverted mode when the diverter assembly 70 is in the lowered position. Water flow is represented by arrows 82 in the non-diverted mode when the diverter assembly 70 is in the lowered position. In this mode, water flows out of the opening 54 of the spout 46.

Figure 10:
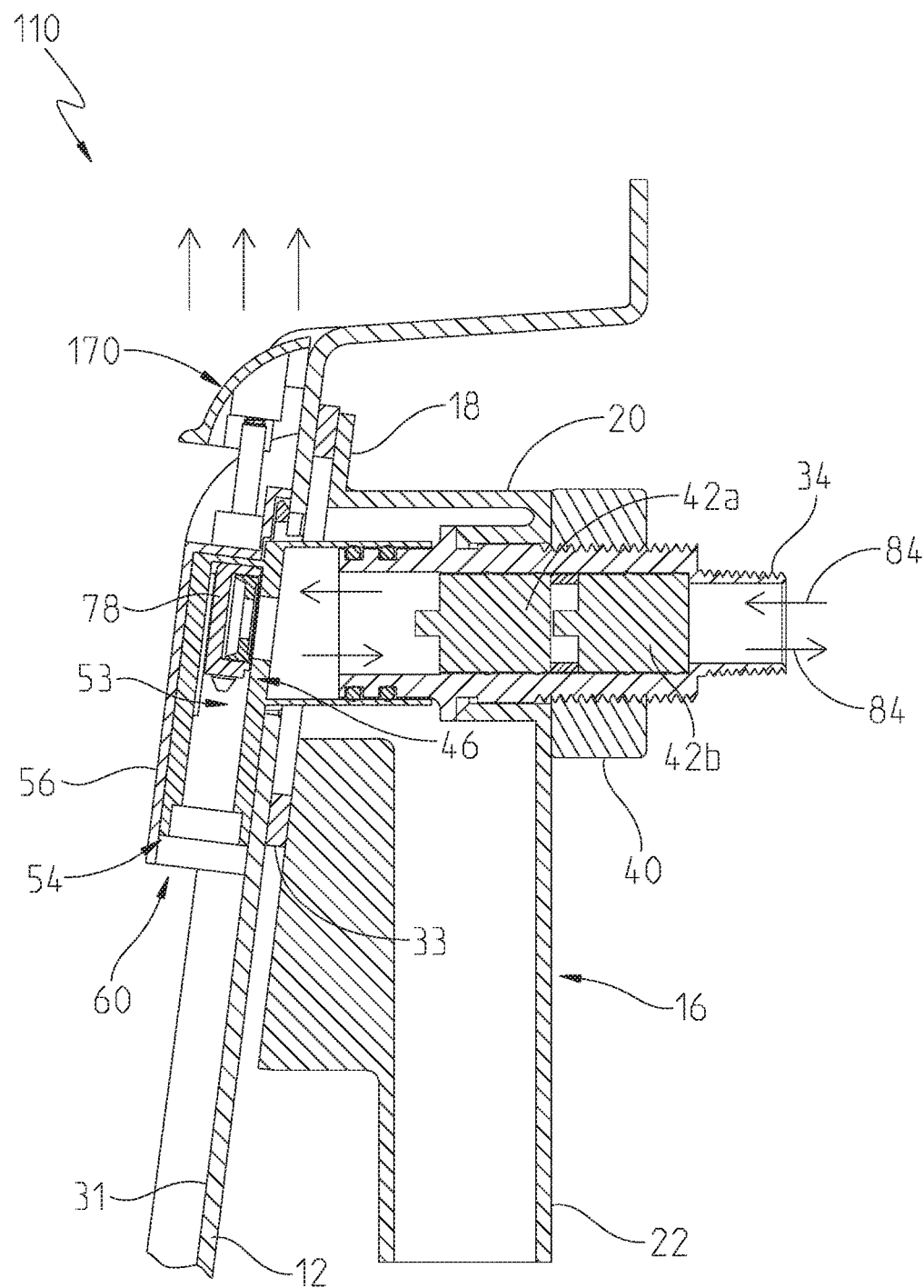
FIG. 10 is a cross-sectional view similar to FIG. 7, showing water flow in a diverted mode when the diverter is in a raised position.

In a raised position of the plunger 78, the diverter assembly 70, 170 is in a diverted mode such that water is prevented from flowing through the spout 46 and instead is diverted to a secondary fluid device, such as an overhead showerhead (not shown) (as shown by arrows 84 in FIG. 10). FIG. 10 is a cross-sectional view of the tub spout assembly 110, showing water flow (arrows 84) in a diverted mode when the diverter assembly 70 is in the raised position. In this mode, water is prevented from flowing out of the opening 54 of the spout 46 and, instead, is diverted to a secondary fluid device, such as a showerhead (not shown).

An overflow mode of operation illustratively occurs when the level of water within the bathtub 14 reaches the lower portion of the mounting flange 18. In such an overflow mode, water flows through the overflow passageway 24 defined by the overflow tube 22 and to a drain (not shown) (as shown by arrows 86 in FIGS. 1 and 3).

Another illustrative embodiment tub spout assembly 210 is shown in FIGS. 11-18. Tub spout assembly 210 has many of the same components as tub spout assemblies 110 and 10 identified above. As such, similar components will be identified with like reference numbers. Illustrative tub spout assembly 210 includes a structure to facilitate different types of water flow.

Figure 11:
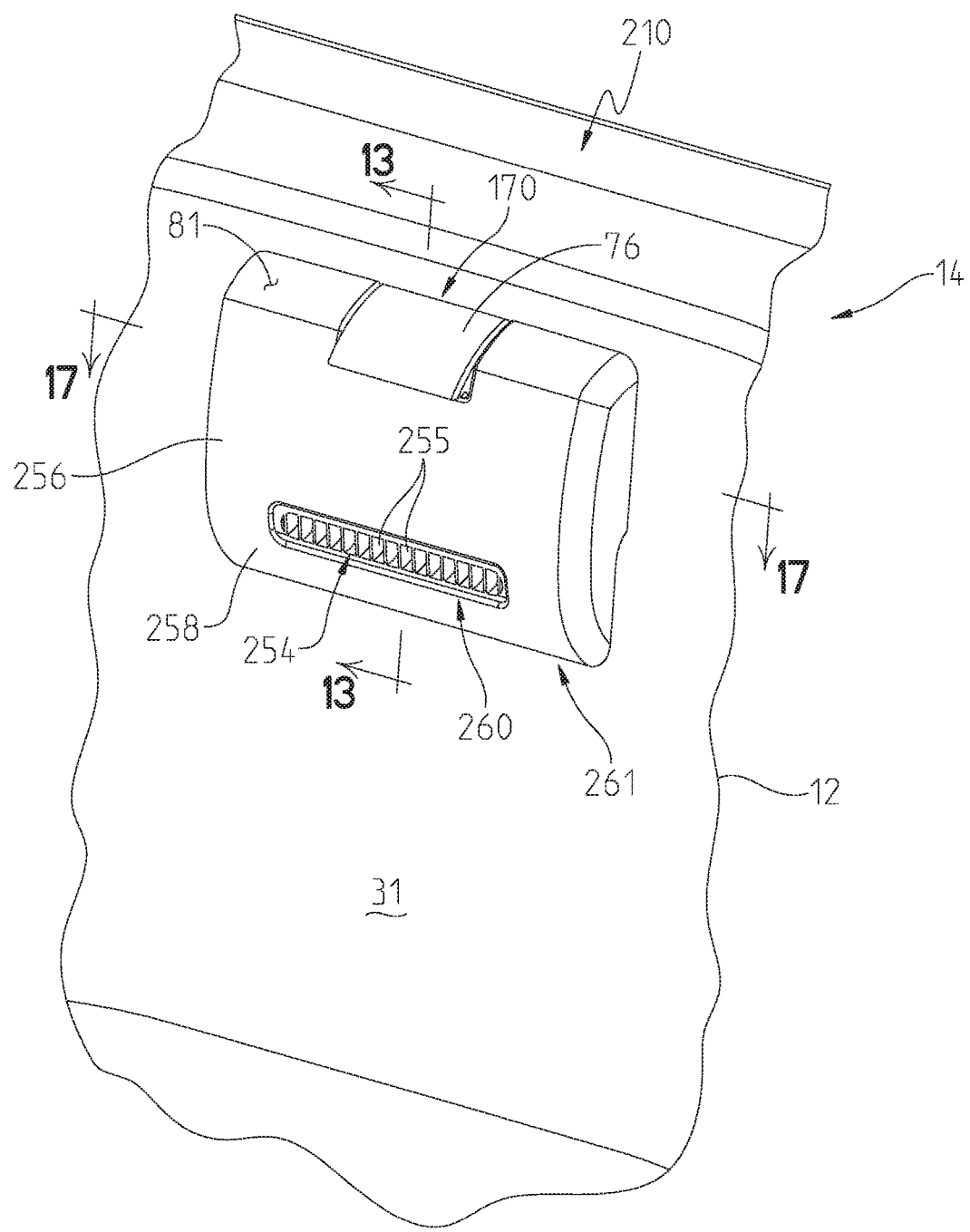
FIG. 11 is a perspective view of an illustrative spout assembly coupled to a bathtub wall.
Figure 12:
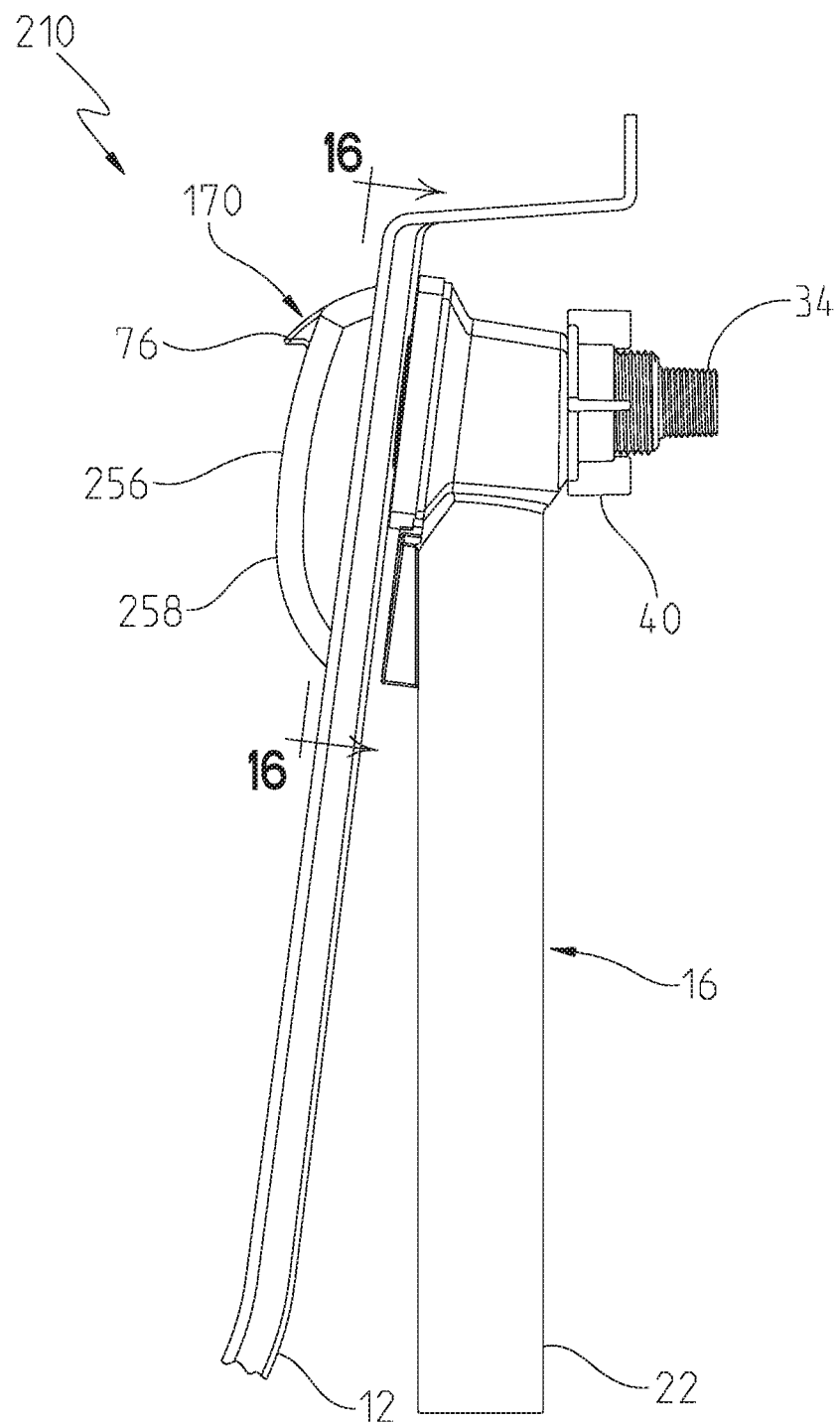
FIG. 12 is a side elevational view of the spout assembly of FIG. 11.
Figure 13:
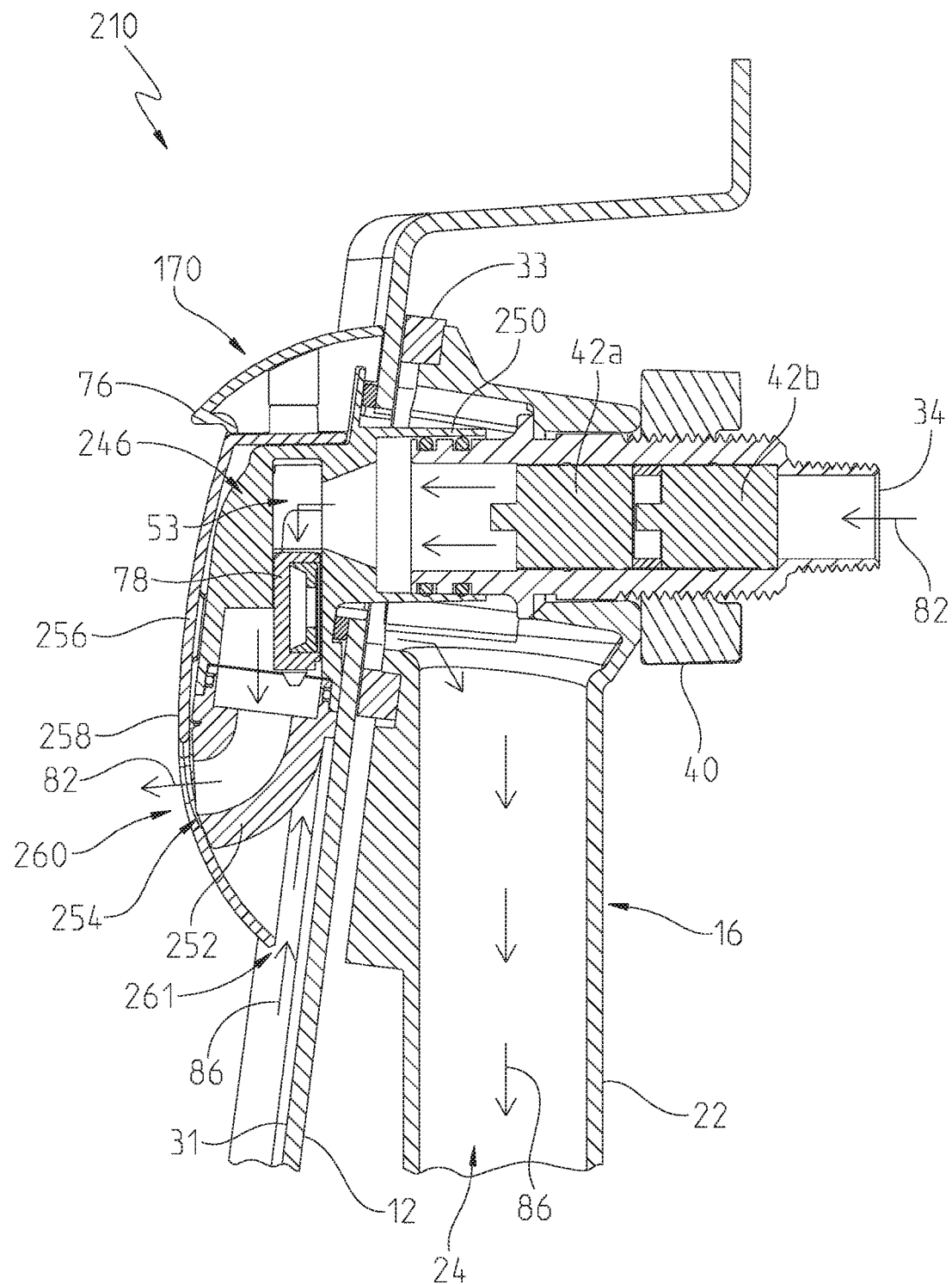
FIG. 13 is a cross-sectional view of the spout assembly of FIG. 11, taken along line 13-13, showing inlet water flow in the non-diverted mode when the diverter is in a lowered position, and water overflow passing through the overflow passageway.
Figure 14:
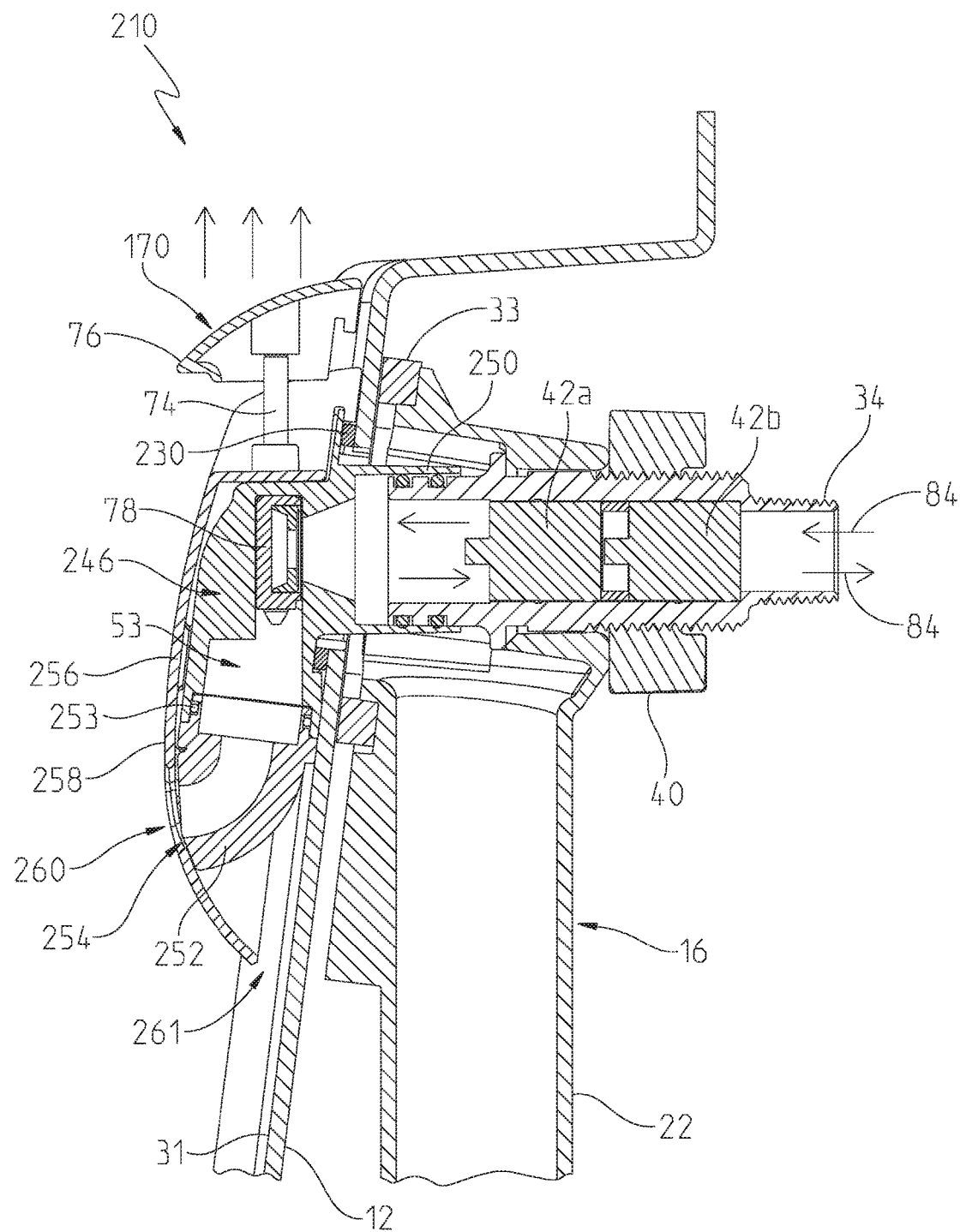
FIG. 14 is a cross-sectional view similar to FIG. 13, showing water flow in the diverted mode when the diverter is in a raised position.

Referring to FIGS. 11-13, illustrative embodiment tub spout assembly 210 is shown mounted to sidewall 12 of bathtub 14 and includes overflow body 16 including mounting flange 18, housing 20, and downwardly extending overflow tube 22 defining overflow passageway 24. A clamp flange 230 is illustratively supported on inner surface 31 of the sidewall 12. Conventional fasteners, such as bolts 32, may secure the mounting flange 18 to the clamp flange 230, and thereby secure the overflow body 16 and the clamp flange 230 to the sidewall 12. Elastomeric gasket 33 may be positioned intermediate the mounting flange 18 and the sidewall 12. Arcuate protrusions 232 of the clamp flange 230 are illustratively received within arcuate grooves 234 of the overflow body 16 to help orient and secure the clamp flange 230 to the overflow body 16.

Figure 19:
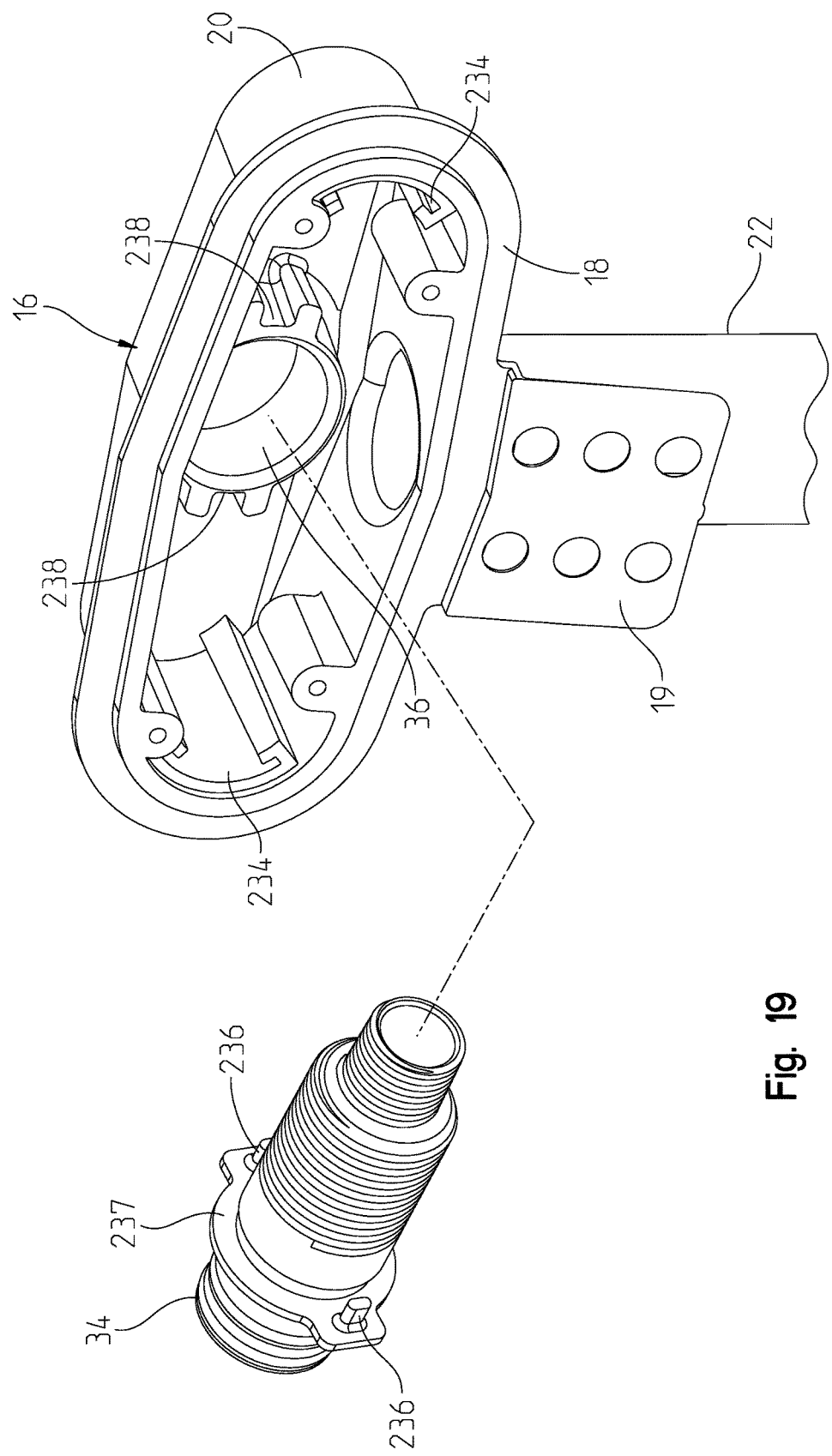
FIG. 19 is an exploded perspective view of the overflow body and the inlet tube of FIG. 11.

Waterway insert or inlet tube 34 is supported by rear opening 36 in the overflow body 16 and defines inlet passageway 38. Mounting nut 40 is illustratively threadably coupled with the inlet tube 34, thereby securing the inlet tube 34 to the overflow body 16. With reference to FIG. 19, rearwardly extending locating protrusions 236 are illustratively supported by a flange 237 of the inlet tube 34. The protrusions 236 are received within recesses 238 in the overflow body 16 to help orient and secure the inlet tube 34 relative to the overflow body 16.

An outlet, illustratively a spout 246, is fluidly coupled to the inlet tube 34. The spout 246 illustratively includes a main spout housing or body 249 supporting an inlet or receiving tube 250. More particularly, an outlet end 48 of the inlet tube 34 is illustrative received within the inlet tube 250 of the spout 246.

An outlet, illustratively a bottom cap or flow director housing 252, is secured to the bottom of the spout 246 and defines a water outlet 254. A seal, such as gasket 253, is illustratively positioned intermediate the spout 246 and the flow director housing 252. The flow director housing 252 is fluidly coupled with the spout body 249 to define outlet passageway 53. A plurality of vanes or flow directors 255 are illustratively supported by the flow director housing 252 in order to provide an even distribution of water flow from the water outlet 254.

Fasteners, such as bolts 55, may secure the flow director housing 252 to the spout body 249. The flow director housing 252 may be removed from the spout body 249 and replaced with another flow director housing having different flow characteristics (e.g., flow area, vane positions, etc.).

An outlet cap or spout cover 256 receives the spout 246 and includes an arcuate inner wall 258 defining a first opening 260 and a second opening 261 positioned below the first opening 260. The first opening 260 is illustratively in fluid communication with the water outlet 254 of the spout 246 and the inlet passageway 38. The second opening 261 is illustratively defined between the inner surface 31 of the sidewall 12 of the bathtub 14 and a lower end of the inner wall 258 of the spout cover 256. The second opening 261 is illustratively in fluid communication with the overflow passageway 24 of the overflow body 16 (as shown by arrows 86 in FIGS. 13 and 16).

Figure 15:
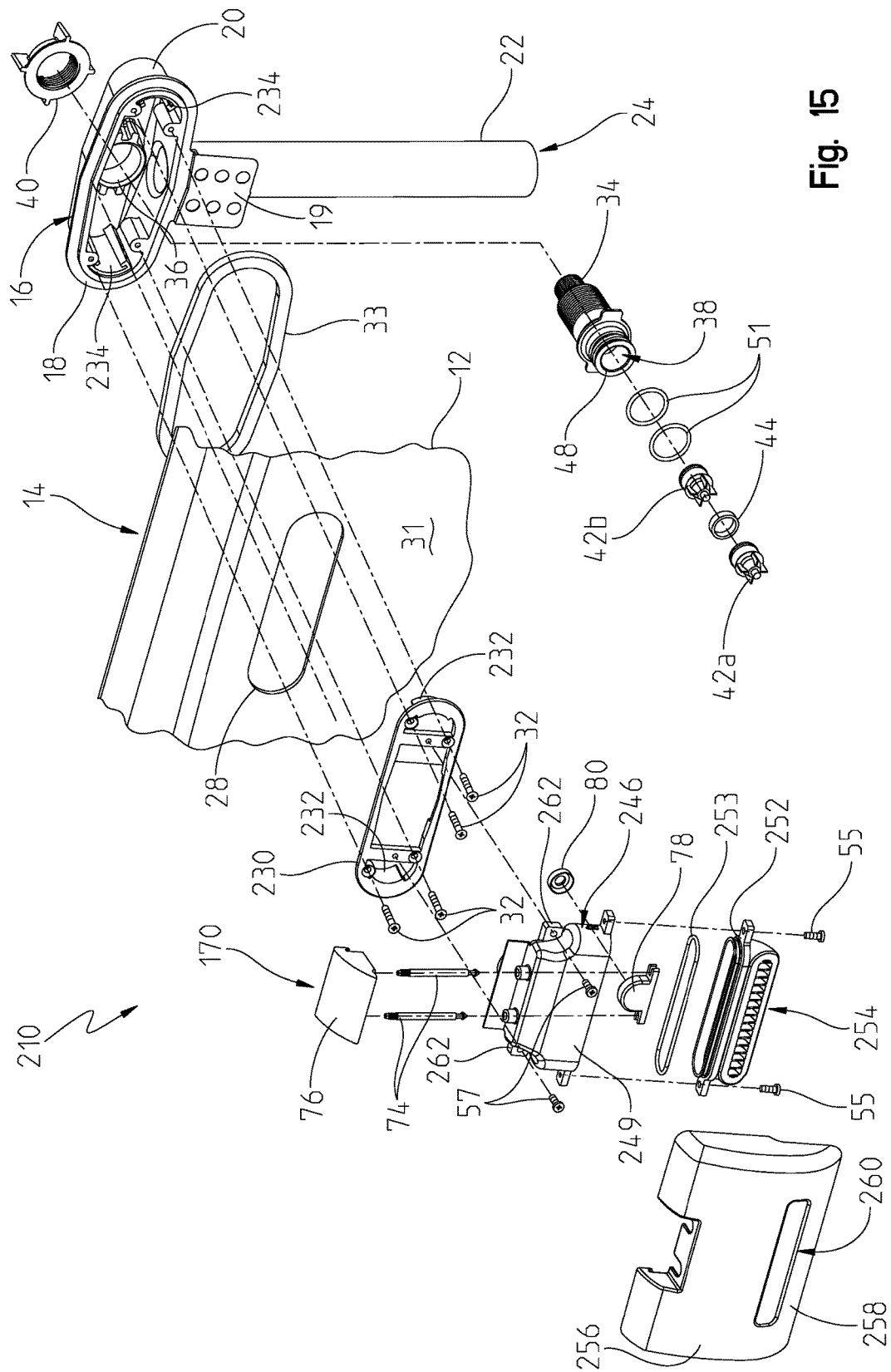
FIG. 15 is an exploded perspective view of the spout assembly of FIG. 11.
Figure 16:
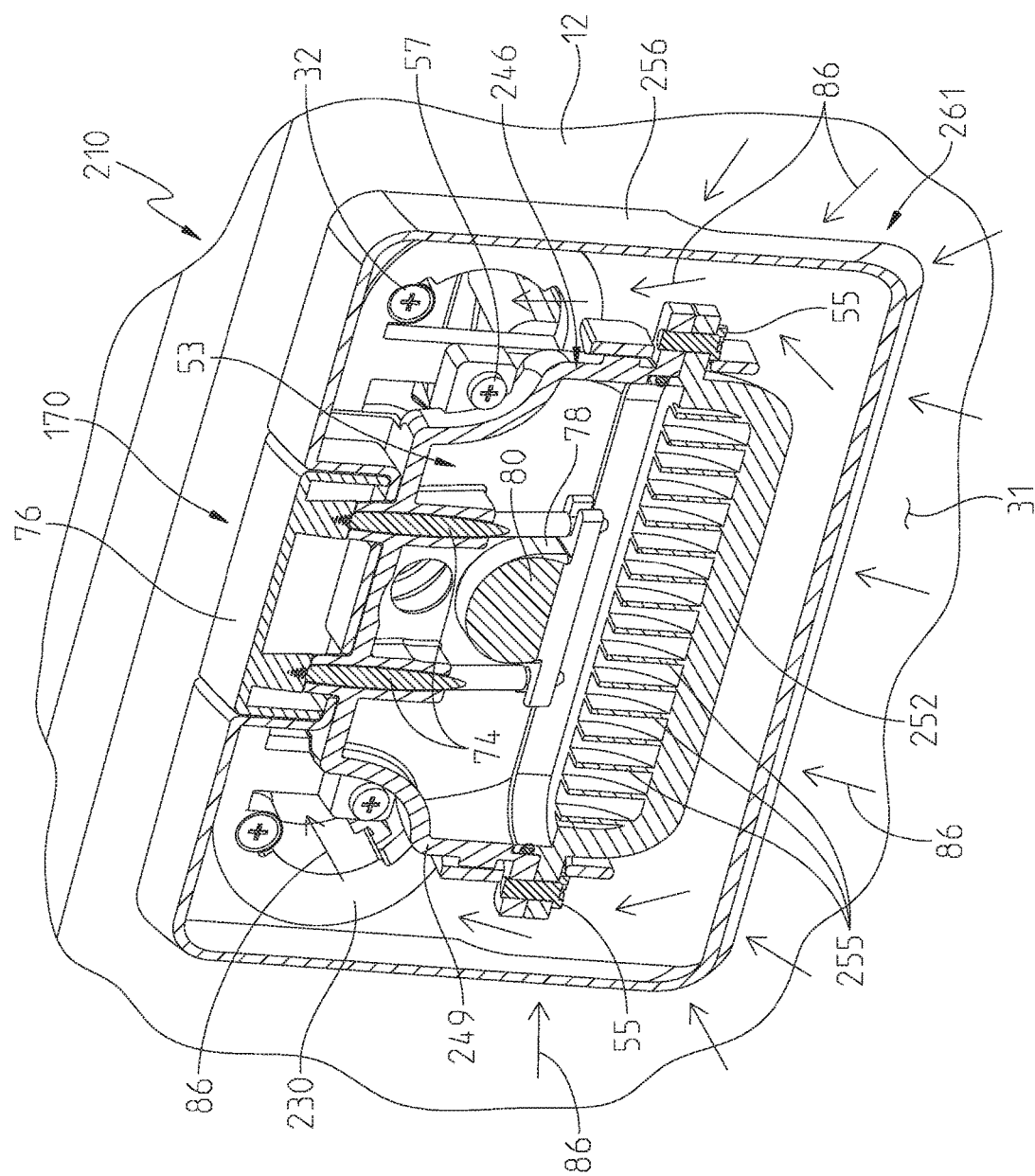
FIG. 16 is a perspective view, in cross-section, taken along line 16-16 of FIG. 12.
Figure 17:
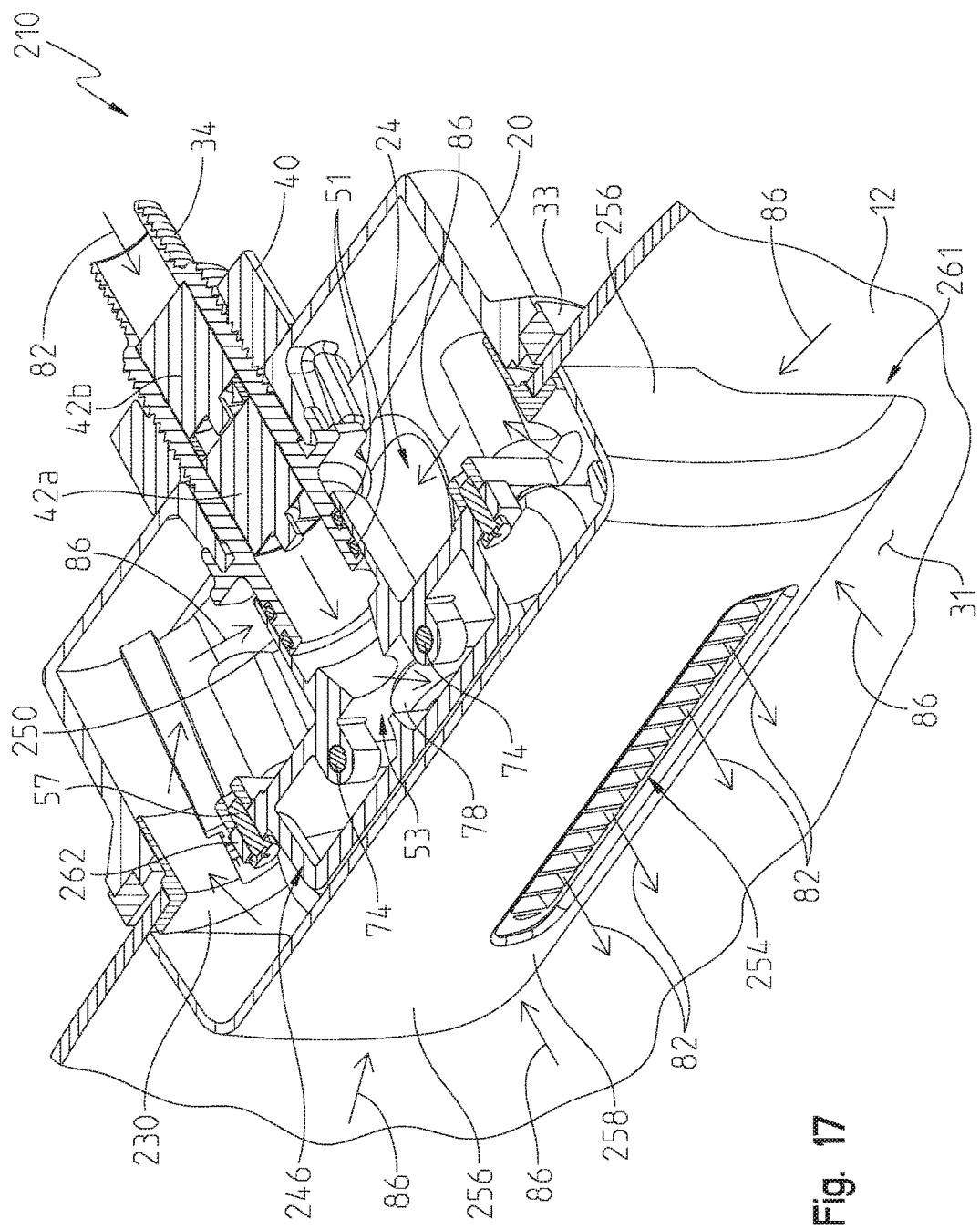
FIG. 17 is a perspective view, in cross-section, taken along line 17-17 of FIG. 11.
Figure 18:
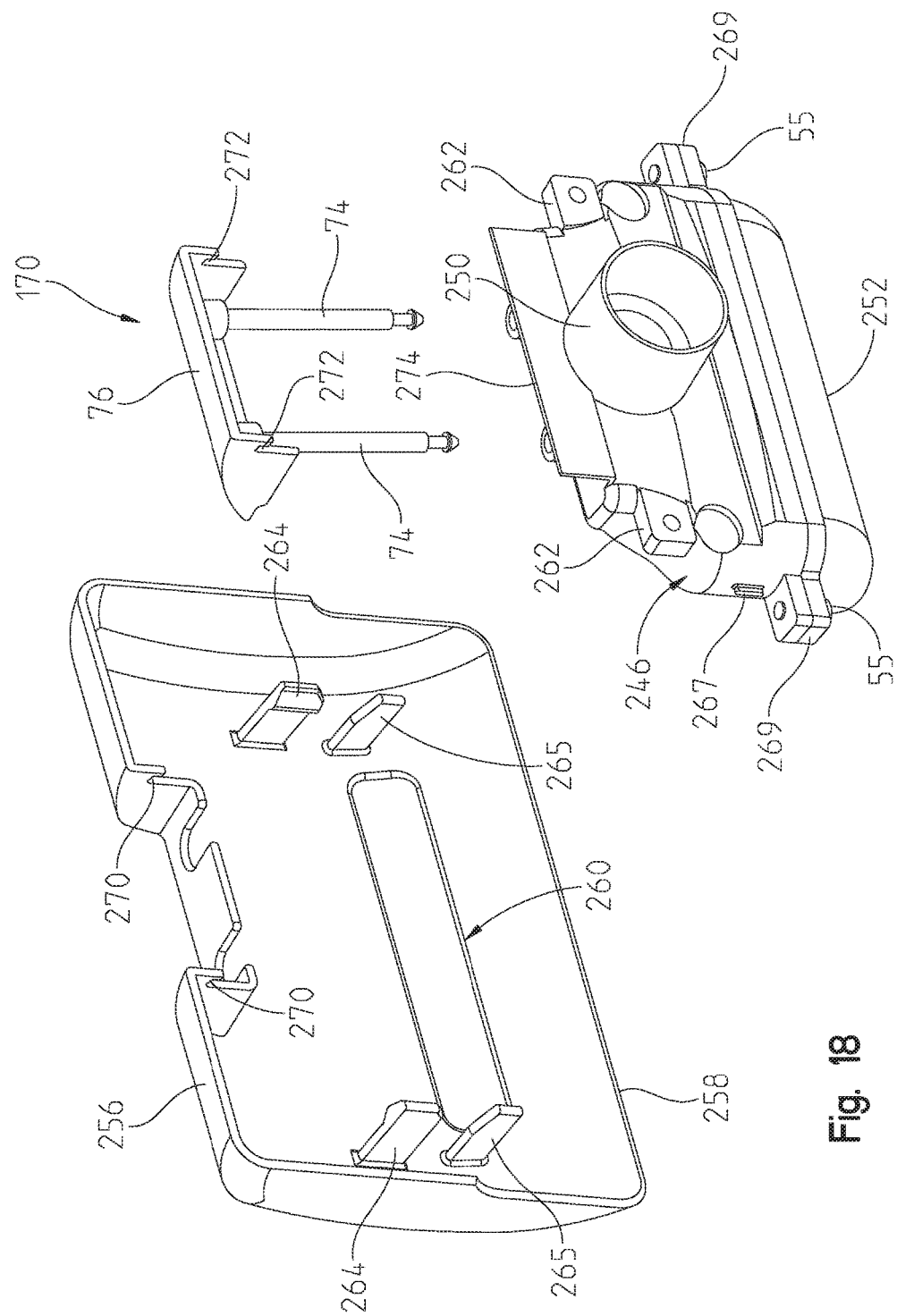
FIG. 18 is an exploded perspective view of the spout, the spout cover, and the diverter assembly of FIG. 11.

With reference to FIGS. 15 and 18, fasteners, such as screws 57, secure tabs 262 of the spout 246 to the clamp flange 230. As shown in FIG. 18, the spout cover 256 illustratively includes opposing snap fingers or latches 264 that snap over tabs 267 supported by the spout 246, thereby releasably securing the spout cover 256 to the spout 246.

A diverter assembly 170 is illustratively supported by the spout 246. The diverter assembly 170 is illustratively substantially similar to that identified above. More particularly, the diverter assembly 170 includes a non-diverted mode of operation and a diverted mode of operation.

Retaining tabs 265 extend rearwardly from the wall 258 of the spout cover 256 and cooperate with tabs 269 supported by the spout 246. More particularly, the retaining tabs 265 are positioned below tabs 269 to retain the spout 246 with the spout cover 256. Receiving slots 270 and 272 in the spout cover 256 and the diverter pull 76, respectively, receive an upwardly extending wall 274 of the spout 246 to further couple the spout 246 and the spout cover 256.

Although the invention has been described in detail with reference to certain preferred embodiments, variations and modifications exist within the spirit and scope of the invention as described and defined in the following claims.

The invention claimed is:

1. A tub spout assembly comprising:
an overflow body defining an overflow passageway;
an inlet tube supported by the overflow body and defining an inlet passageway;
a spout fluidly coupled to the inlet tube and including a spout outlet;
a spout cover receiving the spout and including an inner wall defining at least one opening, wherein the at least one opening is in fluid communication with the overflow passageway and the inlet passageway, and the overflow passageway surround the inlet passageway within the overflow body; and
a diverter assembly supported by the overflow body, the diverter assembly configured to selectively open and close fluid communication between the inlet passageway and the spout outlet.

2. The tub spout assembly of claim 1, wherein the at least one opening of the spout cover is a single downwardly facing opening in fluid communication with both the overflow passageway and the inlet passageway.

3. The tub spout assembly of claim 1, wherein the at least one opening of the spout cover includes a first opening in fluid communication with the inlet passageway through the spout outlet, and a second opening in fluid communication with the overflow passageway.

4. The tub spout assembly of claim 1, wherein the spout body defines a lift rod passageway, and the diverter assembly includes a lift rod movably supported within the lift rod passageway, and a plunger operably coupled to the lift rod and configured to move with the lift rod between a first position and a second position, wherein in the first position water is configured to flow from the inlet passageway through the at least one opening of the spout cover, and in the second position water is prevented from flowing through the spout outlet and is diverted to a secondary fluid delivery device.

5. The tub spout assembly of claim 4, wherein the secondary fluid delivery device is an overhead showerhead.

6. The tub spout assembly of claim 4, wherein the diverter assembly further includes a diverter pull coupled to an upper end of the lift rod.

7. The tub spout assembly of claim 6, wherein the diverter pull is configured to be received within the spout cover to form a flush outer surface.

8. The tub spout assembly of claim 1, further comprising a check valve supported within the inlet passageway.

9. The tub spout assembly of claim 1, wherein the inner wall of the spout cover is arcuate.

10. The tub spout assembly of claim 9, wherein the inner wall curves inwardly from opposing ends towards an apex, wherein when the tub spout assembly is installed in a bathtub, the apex is configured to be no more than 1.0 inches from a sidewall of the bathtub.

11. A tub spout assembly comprising:
an overflow body defining an overflow passageway;
an inlet tube supported by the overflow body and defining an inlet passageway;

a spout fluidly coupled to the inlet tube and including a spout outlet;

a spout cover receiving the spout body and including an inner wall defining an opening in fluid communication with the inlet passageway; and a diverter assembly supported by the spout, the diverter assembly configured to selectively open and close fluid communication between the inlet passageway to the spout outlet.

12. The tub spout assembly of claim 11, wherein the opening of the spout cover is a downwardly facing opening in fluidly communication with both the overflow passageway and the inlet passageway.

13. The tub spout assembly of claim 11, wherein the opening of the spout cover includes a first opening in fluid communication with the inlet passageway through the spout outlet, and a second opening in fluid communication with the overflow passageway.

14. The tub spout assembly of claim 11, wherein the spout body defines a passageway configured to slidably receive a diverter rod.

15. The tub spout assembly of claim 11, wherein the spout body defines a diverter rod passageway, and the diverter assembly includes a diverter rod movably supported within the diverter rod passageway, and a plunger operably coupled to the diverter rod and configured to move with the diverter rod between a first position and a second position, wherein the first position water is configured to flow from the inlet passageway through the downwardly facing opening, and in the second position water is prevented from flowing through the outlet and is diverted to a secondary fluid delivery device spaced apart from the spout body.

16. The tub spout assembly of claim 15, wherein the secondary fluid delivery device is an overhead showerhead.

17. The tub spout assembly of claim 15, wherein the diverter assembly further includes a diverter pull coupled to an upper end of the diverter rod.

18. The tub spout assembly of claim 17, wherein the diverter pull is configured to be received within the outlet cap to form a flush surface.

19. A tub spout assembly configured for mounting on a sidewall of a bathtub, the tub spout comprising:

an overflow body defining an overflow passageway, the overflow body comprising an overflow mounting flange configured to be supported on an outer surface of the side wall of the bathtub;

an inlet tube supported by the overflow body and defining an inlet passageway;

a spout fluidly coupled to the inlet tube and including a spout outlet;

a spout cover receiving the spout and including an inner wall defining at least one opening in fluid communication with the overflow passageway and the inlet passageway;

a clamp flange supporting the spout cover, the clamp flange configured to be supported on an inner surface of the sidewall of the bathtub; and wherein the overflow mounting flange and the clamp flange cooperate to mount the tub spout assembly on the sidewall of the bathtub.

20. The tub spout assembly of claim 19, wherein the at least one opening of the spout cover is a single downwardly facing opening in fluid communication with both the overflow passageway and the inlet passageway.

21. The tub spout assembly of claim 19, wherein the at least one opening of the spout cover includes a first opening in fluid communication with the inlet passageway through the spout outlet, and a second opening in fluid communication with the overflow passageway.

22. The tub spout assembly of claim 19, further comprising a plurality of fasteners extending between the overflow mounting flange and the clamp flange to secure the overflow body and the clamp flange to the sidewall.

23. The tub spout assembly of claim 19, further comprising an elastomeric gasket positioned intermediate the mounting flange and the sidewall.

24. The tub spout assembly of claim 19, wherein the spout cover includes a plurality of opposing grooves each configured to receive a cooperating rail supported by the clamp flange to releasably secure the spout cover to the clamp flange.

25. The tub spout assembly of claim 19, wherein the spout cover includes a plurality of snap fingers each configured to receive a cooperating tab supported by the spout to releasably secure the spout cover to the spout.

26. The tub spout assembly of claim 1, wherein the diverter assembly further comprises at least two lift rods.

27. The tub spout assembly of claim 19, further comprising a diverter assembly supported by the overflow body, the diverter assembly configured to selectively open and close fluid communication between the inlet passageway and the spout outlet.

* * * * *